United States Patent Office 2,927,935
Patented Mar. 8, 1960

2,927,935

PREPARATION OF CYCLOPENTADIENYL MANGANESE TRICARBONYL COMPOUNDS

Thomas H. Coffield, Farmington, and Normand Hebert, Detroit, Mich., assignors to Ethyl Corporation, New York, N.Y., a corporation of Delaware No Drawing. Application August 23, 1957
Serial No. 680,013

5 Claims. (Cl. 260—429)

The present invention relates to a novel process for the preparation of organometallic compounds and more particularly to a process for the preparation of cyclopentadienyl manganese tricarbonyl compounds.

Metallic cyclomatic compounds possess properties which render them useful as fuel additives and as chemical intermediates. In particular cyclopentadienyl manganese tricarbonyl compounds are valuable as antiknock agents when added to gasoline. It has been proposed to prepare these compounds by a process which broadly consists of forming an intermediate dicyclopentadienyl manganese compound by the reaction between a manganese salt and an alkali metal cyclopentadienyl compound, following which this intermediate is reacted under high pressure at elevated temperatures with carbon monoxide to form the desired cyclopentadienyl manganese tricarbonyl compound. This process has numerous disadvantages.

One outstanding difficulty with the above outlined method for the preparation of cyclopentadienyl manganese tricarbonyl compounds is that the dicyclopentadienyl manganese compound is unstable and requires special handling during the process to prevent its destruction by atmospheric oxidation. A further disadvantage of the above process is that when the dicyclopentadienyl manganese intermediate is reacted with carbon monoxide, one-half of the cyclopentadienyl hydrocarbon originally employed to prepare the intermediate is dissipated in a form which renders its recovery extremely difficult. Still another disadvantage of this process is that it requires the use of special high pressure equipment which is expensive to construct and maintain. The above process also suffers the disadvantage that for best results solvents such as polyethylene glycol ethers or cyclic ethers such as tetrahydrofuran, which are themselves expensive and difficult to prepare, are needed.

It is, therefore, an object of this invention to provide a process for the preparation of cyclopentadienyl manganese tricarbonyl compounds. A further object is to provide a process for the preparation of cyclopentadienyl manganese tricarbonyl compounds which does not require preparation of a dicyclopentadienyl manganese intermediate, and which is conducted at ordinary pressures. Other important objects of this invention will become apparent from the discussion which follows:

It has been found that cyclopentadienyl manganese tricarbonyl compounds are prepared in good yield by a process which comprises reacting a cyclopentadienyl alkali metal compound with an organic non-ionic diamine manganese tricarbonyl halide in an inert solvent. An illustrative example of the process of this invention comprises a reaction between cyclopentadienyl sodium and dianiline manganese tricarbonyl bromide in tertiary-butanol as a solvent. This reaction easily produces an outstandingly high yield of cyclopentadienyl manganese tricarbonyl.

By an organic non-ionic diamine manganese tricarbonyl halide is meant a coordination compound formed by the reaction of an organic compound containing amino nitrogen and a manganese carbonyl halide. The compounds containing amino nitrogen include the primary, secondary and tertiary amines, both aliphatic and aromatic, and heterocyclic organic compounds containing nitrogen as the only heterocyclic atom. The term "amine" as used in this specification includes compounds having 1 or 2 nitrogen atoms in the molecule. Thus, the manganese diamine tricarbonyl halide compounds have the formula $AMn(CO)_3X$ where A represents 2 molecules of a mono amine or 1 molecule of a diamine, and X is a halogen having an atomic number of at least 17, i.e. from the group consisting of a chlorine, bromine and iodine. Examples of the manganese diamine tricarbonyl halide compounds applicable to the process of this invention include di(methyl amine) manganese tricarbonyl bromide, di(aniline) manganese tricarbonyl chloride, di-(N-methyl aniline)manganese tricarbonyl iodide, dipyridine manganese tricarbonyl bromide and the like.

The alkali metal cyclopentadienyl compound reacted with the diamine manganese tricarbonyl halide compound in the process of this invention is conveniently prepared by reacting an alkali metal with a cyclopentadienyl hydrocarbon compound. Examples of the alkali metal cyclopentadienyl hydrocarbon compounds applicable to the instant process include cyclopentadienyl sodium, methylcyclopentadienyl lithium, indenyl potassium, ethylcyclopentadienyl sodium and the like, including analogous compounds of rubidium and cesium.

Cyclopentadienyl manganese tricarbonyl compounds can be prepared by the process of this invention at relatively low temperatures by heating the reactants, preferably in the presence of a solvent. The temperatures employed vary from about 20° C. to about 150° C. Preferred temperatures are in the range of 25° to 100° C. as excellent yields of product are readily obtained in this temperature range. Depending upon the particular reactants employed and the temperature utilized, reaction times of from a few minutes up to about 10 hours or longer are employed. Ordinarily, however, reaction times of from 15 minutes to 4 hours give an excellent yield of cyclopentadienyl manganese tricarbonyl compound.

The process of this invention has the outstanding advantage of being conducted at atmospheric pressure thus minimizing the complexity and cost of the required reaction equipment.

The reaction of an organic non-ionic diamine manganese tricarbonyl halide compound and an alkali metal cyclopentadienyl to form a cyclopentadienyl manganese tricarbonyl compound according to the process of this invention is preferably conducted in the presence of a solvent. Suitable solvents include the lower aliphatic alcohols, ethers, polyethers and cyclic ethers. The alcohols are preferred as high yields of product are obtained by their use.

A preferred embodiment of this invention comprises reacting an organic non-ionic diamine manganese tricarbonyl halide compound with methyl cyclopentadienyl sodium in a lower alkyl alcohol at the reflux temperature of the alcohol. The methyl cyclopentadienyl manganese tricarbonyl, which is produced by this reaction, is an antiknock agent of outstanding activity as will be pointed out in greater detail hereinafter.

The organic non-ionic diamine manganese tricarbonyl halide compounds most applicable to this invention are those in which the diamine portion contains up to about 24 carbon atoms and consists of two molecules of (1) primary or secondary aromatic, aliphatic or mixed aromatic-aliphatic amine or (2) a heterocyclic nitrogen compound having a single ring containing a single nitrogen atom. These particular amine compounds are preferred as they are easily prepared and the most inexpensive. However, other organic non-ionic diamine manganese tricarbonyl halide compounds are employed with equal success.

The following non-limiting examples are illustrative of the process of this invention. In these examples all parts and percentages are by weight.

Example I

Thirty-one parts of a 50 percent dispersion of sodium in light mineral oil was added 3150 parts of freshly distilled tertiary-butanol containing 44.3 parts of freshly distilled cyclopentadiene. To this mixture was added 200 parts of dipyridine manganese tricarbonyl bromide. The reaction mixture was refluxed at about 83° C. for 3 hours. The tertiary-butanol was removed under vacuum and the residue was sublimed. Thirty-five parts of cyclopentadienyl manganese tricarbonyl having a melting point of from 76 to 78° C. was obtained and identified by infrared analysis. The yield was 32.4 percent based on dipyridine manganese tricarbonyl bromide.

Dipyridine manganese tricarbonyl bromide, a starting material in the process of this invention, is an orange yellow crystalline solid which is stable without melting to over 200° C. when heated in air.

Example II

Ethylcyclopentadiene (49 parts) is added to 3.4 parts of lithium as lithium methylate contained in 200 parts of methanol. The solution is refluxed for a short time to prepare ethylcyclopentadienyl lithium. Thereafter, 170 parts of dianiline manganese tricarbonyl chloride prepared by the reaction of manganese pentacarbonyl chloride and aniline are added and the reaction mixture is maintained at 65° C. for 4 hours. An excellent yield of ethylcyclopentadienyl manganese tricarbonyl is separated from the reaction mixture by fractional distillation at reduced pressure. The ethylcyclopentadienyl manganese tricarbonyl has a boiling point of 48–49° C. at 0.3 millimeter of pressure.

The dianiline manganese tricarbonyl chloride used as a reactant in the above example was prepared from manganese pentacarbonyl chloride and aniline. It is a yellow orange crystalline solid which sublimes at 140 to 150° C. at about one millimeter of pressure. When heated at atmospheric pressure the compound does not melt at temperatures up to about 225° C.

Example III

Potassium metal (39 parts) in the form of a 50 percent dispersion in light mineral oil is added to a reaction vessel containing 200 parts of diethyl ether and 120 parts of indene and the mixture is heated to 30° C. with agitation. Ethylene diamine manganese tricarbonyl iodide (270 parts) prepared by the reaction of ethylene diamine and manganese pentacarbonyl iodide is then added to the reaction vessel and the system is refluxed for 10 hours at about 35° C. Indenyl manganese tricarbonyl having a melting point of 50–51° C. is separated from the reaction mixture in the form of orange colored crystals by fractionation followed by sublimation.

Example IV

Methylcyclopentadienyl sodium (102 parts) prepared by the reaction of methylcyclopentadiene and sodium tertiary-butylate, and contained in 500 parts of tertiary-butanol is reacted with 450 parts of di(N-ethyl aniline) manganese tricarbonyl bromide at 50° C. for 2 hours. An excellent yield of methylcyclopentadienyl manganese tricarbonyl having a freezing point of −0.75° C. is separated from the reaction mixture by fractional distillation.

Example V

Tertiary-butyl cyclopentadienyl manganese tricarbonyl is prepared from tertiary-butyl cyclopentadienyl lithium and di(n-butyl amine) manganese tricarbonyl bromide. The procedure consists of preparing tertiary-butyl cyclopentadienyl lithium by reacting 7 parts of lithium with 130 parts of tertiary-butyl cyclopentadiene in 340 parts of tetrahydrofuran. Di(n-butyl amine) manganese tricarbonyl bromide (325 parts) is then added to the reaction mixture and the system is maintained at reflux for ½ hour. The product tertiary-butyl cyclopentadienyl manganese tricarbonyl is separated from the reaction mixture by fractionation at reduced pressure followed by recrystallization.

Example VI

The procedure of Example IV is followed using 100 parts of iso-octyl cyclopentadienyl sodium, 225 parts of isopropyl alcohol as a solvent and 135 parts of di(methyl amine) manganese tricarbonyl bromide. A good yield of iso-octyl cyclopentadienyl manganese tricarbonyl results.

Example VII

The procedure of Example III is followed using 45 parts of sodium, 165 parts of methylcyclopentadiene, 800 parts of amyl ether and 1000 parts of di(dodecyl amine) manganese tricarbonyl bromide. There results a good yield of methylcyclopentadienyl manganese tricarbonyl.

Example VIII

The procedure of Example V is followed using 20 parts of a 50 percent dispersion of sodium in mineral oil, 32 parts of cyclopentadiene, 200 parts of dimethyl ether of diethylene glycol as a solvent and 225 parts of di(dimethyl phenyl amine) manganese tricarbonyl iodide. Cyclopentadienyl manganese tricarbonyl having a melting point of 77° C. is separated in good yield from the reaction mixture.

When the cyclopentadienyl hydrocarbon employed to prepare the alkali metal cyclopentadienyl compound, which is a reactant in the process of this invention, is a lower alkyl cyclopentadiene or cyclopentadiene itself, it often exists as the dimer, for example, dimethylcyclopentadiene. When desired, the dimer cyclopentadienyl hydrocarbon is thermally cracked to the monomeric compound prior to reaction with an alkali metal. However, it is also possible to prepare the cyclopentadienyl alkali metal compound directly from the dimer by thermally decomposing the dimer in the presence of the alkali metal reactant.

The cyclopentadienyl hydrocarbon employed in the process of this invention contains from 5 to about 13 carbon atoms. Included are unsubstituted cyclopentadiene, an alkyl or aryl substituted cyclopentadiene or a cyclopentadienyl hydrocarbon containing up to 2 aromatic hydrocarbon rings condensed thereto. Further examples of these cyclopentadienyl compounds include cyclopentadiene, methylcyclopentadiene, amyl cyclopentadiene, n-octyl cyclopentadiene, indene, fluorene, phenylcyclopentadiene, butyl cyclopentadiene, iso-propyl cyclopentadiene, and the like. The lower alkyl substituted cyclopentadienes and cyclopentadiene itself are preferred, as good yields of very useful compounds are obtained when these are employed.

The alkali metal used to prepare the cyclopentadienyl alkali metal compound which is a reactant in the process of this invention can include sodium, potassium, lithium, rubidium and cesium. Potassium, lithium and sodium represent a preferred class as they are more readily available. Sodium is particularly preferred since it is commercially available in large quantities.

When preparing the alkali metal cyclopentadienyl compound, it is preferred to use a small excess (up to about 20 percent) cyclopentadienyl hydrocarbon so that no reactive alkali metal is present during the formation of the cyclopentadienyl manganese tricarbonyl compound. When conducting the process of this invention, it is further desirable that an excess of cyclopentadienyl alkali metal compound be reacted with the diamine manganese tricarbonyl halide to insure the most complete utilization of the diamine manganese tricarbonyl halide. However, the process is also effectively conducted with a slight excess of diamine manganese tricarbonyl halide.

The organic non-ionic diamine manganese tricarbonyl halide employed in the process of this invention has the formula AMn(CO)$_3$X where A represents an entity containing 2 basic nitrogen atoms and X is a halogen. The entity represented by A, therefore, may comprise 2 molecules of a mono-amine or heterocyclic compound containing nitrogen as the hetero atom. Further, the entity represented by A can represent a single molecule of a diamine or hetero compound containing two nitrogen atoms.

When the nitrogen atoms in the diamines are separated by up to three carbon atoms, the corresponding halo diamine manganese tricarbonyl compound is ordinarily monomeric, whereas when the nitrogen atoms are separated by more than three carbon atoms or are contained in one hetero ring, the corresponding organic non-ionic diamine manganese tricarbonyl halide may be polymeric. Representative non-limiting examples of the diamine manganese tricarbonyl compounds include di(2-ethyl pyridine) manganese tricarbonyl bromide, di(isopropyl amine) manganese tricarbonyl chloride, ethylene diamine manganese tricarbonyl iodide, 2-phenyl-1,3-propylene diamine manganese tricarbonyl bromide, N,N'-diphenyl ethylene diamine manganese tricarbonyl chloride, di(triphenyl amine) manganese tricarbonyl bromide, di(p-biphenyl amine) manganese tricarbonyl iodide, di(dihexyl amine) manganese tricarbonyl iodide, diquinoline manganese tricarbonyl chloride, di(o-phenanthroline) manganese tricarbonyl iodide, and the like. Those compounds prepared from amines having up to about 12 carbon atoms are preferred since the applicable amines are more readily available. The diamine manganese tricarbonyl bromide compounds are preferred for laboratory use as they are the most readily prepared in the laboratory; however, for large scale operations the diamine manganese tricarbonyl chloride compounds are preferred as they are less expensive to prepare on a large scale.

In conducting the process of this invention the reactants may be admixed in any order but preferably so that alkali metal in a reactive form does not come into contact with the organic non-ionic diamine manganese tricarbonyl halide compound. Thus, the cyclopentadienyl alkyli metal compound which has been preformed may be added to the diamine manganese tricarbonyl halide contained in a solvent or in the alternative, the amine compound may be added to the mixture of cyclopentadiene metal compound and solvent.

Various solvents may be employed in the practice of this invention. The solvents most applicable are alcohols and ethers including cyclic ethers. Further examples of applicable solvents include ethyl ether, butyl ether, the various propyl ethers, mixed lower alkyl ethers, tetrahydrofuran, dioxane, diethyl ethers of diethyl glycol, dibutylene glycol, methanol, ethanol, isopropanol, butanol, the various $C_5$, $C_6$, $C_7$, and $C_8$ alcohols and the like. The ratio of solvents to reactants in the process of this invention are subject to considerable variation. Based on the amount of cyclopentadienyl alkali metal compound employed, the sodium to solvent ratio may vary from 1 part of sodium and 200 parts of solvent to as little solvent as approximately 1 molecule of solvent per molecule of sodium. Only sufficient solvent to maintain a fluid mass may be employed; however, it is desirable to employ an excess of solvent over this amount so that the reaction mixture may be kept under agitation with the expenditure of a minimum of energy.

The solvents ordinarily have boiling points from about 30° C. to about 250° C. The lower alkyl alcohols having boiling points up to about 180° are preferred as excellent yields of cyclopentadienyl manganese tricarbonyl compounds are obtained by their use.

The temperatures and reaction times employed in the process of this invention depend upon the particular reactants employed and the degree of completion desired. When conducting the process of this invention in batch operations reaction temperatures of from about 20° C. to about 150° C. are employed and reaction time of from a few minutes to about 10 hours are found to be sufficient. A preferred range of temperature is from about 25° C. to about 100° C. and the process is often conducted in this temperature range at the reflux point of the particular solvent employed. In these instances reaction times of from 15 minutes to about 4 hours are found to give excellent results.

The process of this invention is also ideally suited to continuous operations which case the shorter reaction times and higher temperatures are conveniently employed.

An outstanding advantage of this invention when either batch or continuous methods are employed is that the solvent and the amine may be recovered for recycle. The reaction between cyclopentadienyl alkali metal compound and the non-ionic organic diamine manganese tricarbonyl halide releases an amine compound from the diamine manganese tricarbonyl halide. This released amine is conveniently recycled to the preparation of more non-ionic organic diamine manganese tricarbonyl halide.

A variant in the process of this invention comprises the use of a complex compound prepared by the reaction of ammonia and a manganese carbonyl halide. An example of such a compound is ammonia manganese tetracarbonyl bromide which is prepared by the reaction between liquid ammonia and manganese pentacarbonyl bromide at the boiling temperature of liquid ammonia. The resulting compound is used in the process of this invention in lieu of a diamine manganese tricarbonyl halide.

The organic non-ionic diamine manganese tricarbonyl halide is prepared by reacting a manganese pentacarbonyl halide such as manganese pentacarbonyl bromide, Mn(CO)$_5$Br with an amine. The manganese pentacarbonyl halides are readily prepared by direct halogenation of manganese carbonyl. Manganese carbonyl itself is prepared by several known processes including admixing an aryl Grignard reagent with a manganous halide and treating the resulting intermediate with carbon monoxide.

A process for the preparation of a diamine manganese tricarbonyl halide is more completely described in our co-pending patent application Serial No. 680,014, filed August 23, 1957, and entitled Nitrogen Containing Organo-Manganese Compounds.

The cyclopentadienyl manganese tricarbonyl compounds prepared by the process of this invention are outstanding antiknock agents when added to liquid hydrocarbon fuels of the gasoline boiling range. For example, when methylcyclopentadienyl manganese tricarbonyl was added to a commercial gasoline having an initial boiling point of 94° F. and a final boiling point of 390° F. in amount sufficient to prepare a composition containing 1 gram of manganese per gallon, the octane number of the gasoline was raised from 83.1 to 92.3 as determined by the Research Method. The Research Method of determining the octane number of a fuel is generally accepted as a method of test which which gives a good indication of fuel behavior in full-scale, automotive engines under normal driving conditions and the method most used by commercial installations in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in test procedure D–908–55 contained in the 1956 edition of "ASTM Manual of Engine Test Methods" for rating fuels.

The above is merely illustrative of the antiknock effect realized by the use of a cyclopentadienyl manganese tricarbonyl compound. Good results are also obtained when other compounds prepared by the process of this invention, such as cyclopentadienyl manganese tricarbonyl, ethylcyclopentadienyl manganese tricarbonyl, indenyl manganese tricarbonyl and the like are employed in gasolines.

We claim:

1. A process for the preparation of a hydrocarbon cyclopentadienyl manganese tricarbonyl which comprises reacting in an inert liquid solvent, a hyrocarbon cyclopentadienyl alkali metal with an organic non-ionic diamine manganese tricarbonyl halide wherein the halogen has an atomic number of at least 17, and the diamine portion of the molecule contains only carbon, hydrogen and nitrogen and has only 2 atoms of nitrogen.

2. A process for the preparation of methylcyclopentadienyl manganese tricarbonyl which comprises reacting in an inert liquid solvent a hydrocarbon methylcyclopentadienyl alkali metal with an organic non-ionic diamine manganese tricarbonyl halide wherein the halogen has an atomic number of at least 17, and the diamine portion of the molecule contains only carbon, hydrogen and nitrogen and has only 2 atoms of nitrogen.

3. A process for the preparation of methylcyclopentadienyl manganese tricarbonyl which comprises reacting in an inert liquid solvent at temperatures between about 20° C. and 150° C., methylcyclopentadienyl sodium with an organic non-ionic diamine manganese tricarbonyl halide wherein the halogen has an atomic number of at least 17, and the amine portion of the molecule contains only carbon, hydrogen and nitrogen and has only two atoms of nitrogen and contains up to about 24 carbon atoms and consists of two mono-amine radicals selected from the group consisting of a mono-amine radical of (1) primary and secondary aromatic, aliphatic and mixed aromatic-aliphatic amines and (2) heterocyclic nitrogen compounds having a single ring.

4. The process of claim 3 wherein said diamine manganese tricarbonyl halide is dipyridine manganese tricarbonyl bromide.

5. A process for the preparation of cyclopentadienyl manganese tricarbonyl which comprises reacting, in tertiary butanol as a solvent, cyclopentadienyl sodium with dipyridine manganese tricarbonyl bromide.

References Cited in the file of this patent
UNITED STATES PATENTS 2,818,416    Brown et al. _____ Dec. 31, 1957